United States Patent [19]

Bäur et al.

[11] Patent Number: 4,582,125

[45] Date of Patent: Apr. 15, 1986

[54] DEVICE FOR STORING RADIOACTIVE MATERIAL IN A BUILDING WITH A HEAT PIPE INSERTED INTO THE BUILDING WALL

[75] Inventors: Gerhard Bäur, Frankfurt; Klaus Gebke, Gelnhausen; Wolfgang Märker, Heroldsbach, all of Fed. Rep. of Germany

[73] Assignee: Kraftwerk Union Aktiengesellschaft, Mülheim, Fed. Rep. of Germany

[21] Appl. No.: 630,999

[22] Filed: Jul. 16, 1984

Related U.S. Application Data

[63] Continuation of Ser. No. 254,868, Apr. 16, 1981, abandoned.

[30] Foreign Application Priority Data

Apr. 23, 1980 [DE] Fed. Rep. of Germany ....... 3015621

[51] Int. Cl.[4] ............................................. F28D 15/00
[52] U.S. Cl. ................... 165/47; 165/104.14; 165/104.21; 62/238.6
[58] Field of Search ................ 165/47, 104.14, 104.21; 62/238.6

[56] References Cited

U.S. PATENT DOCUMENTS 3,866,424  2/1975  Busey .............................. 165/104.14
4,333,525  6/1982  Ikin et al. ............................ 126/433

FOREIGN PATENT DOCUMENTS 2823376  9/1979  Fed. Rep. of Germany .
2935708  3/1981  Fed. Rep. of Germany .

Primary Examiner—Albert W. Davis, Jr.
Attorney, Agent, or Firm—Herbert L. Lerner; Laurence A. Greenberg

[57] ABSTRACT

Device for storing radioactive material in a building, including a building wall defining an interior of the building, heat pipes being disposed in the wall and having heat exchange surfaces including a part thereof disposed outside the building for giving off heat absorbed in the interior of the building to the air through the part of the heat exchange surfaces outside the building, cooling jackets surrounding the heat exchange surfaces at least in the vicinity of the wall, and a cooling loop for circulating coolant being connected to the cooling jackets for heat recovery.

2 Claims, 1 Drawing Figure

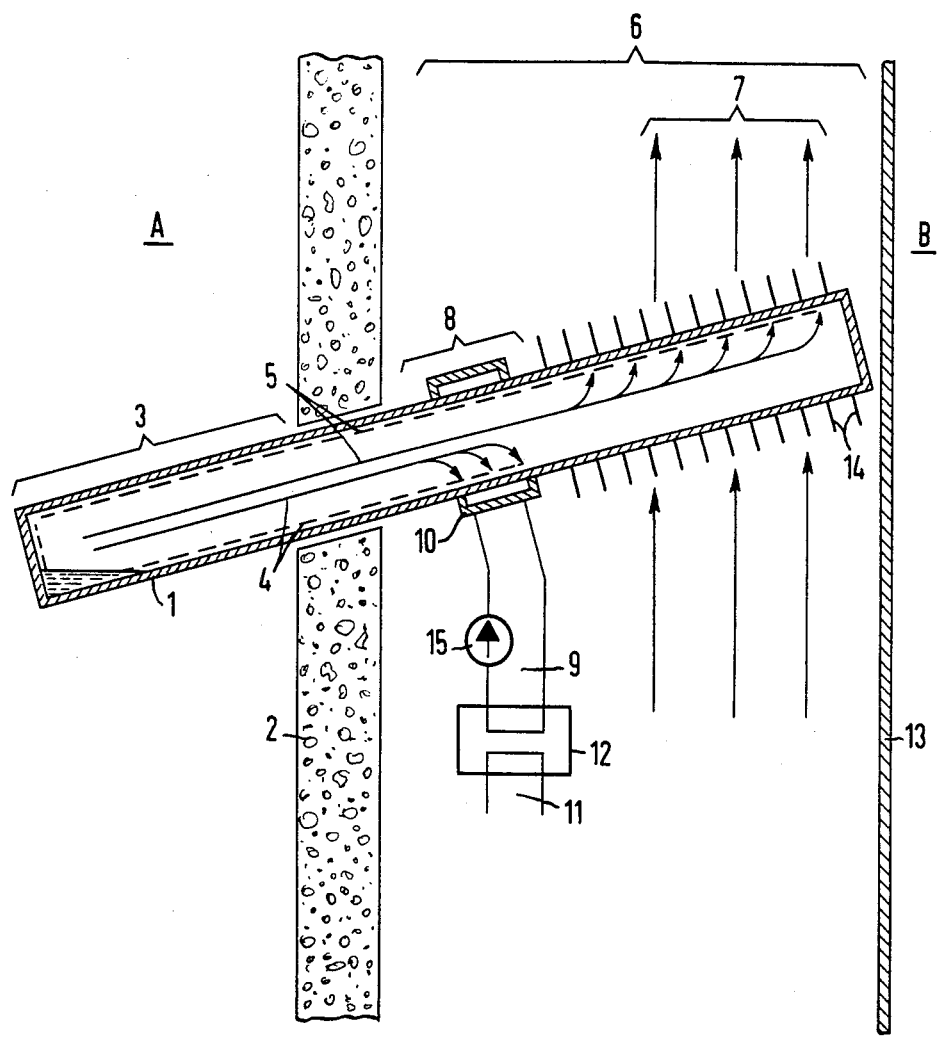

DEVICE FOR STORING RADIOACTIVE MATERIAL IN A BUILDING WITH A HEAT PIPE INSERTED INTO THE BUILDING WALL

This application is a continuation of application Ser. No. 254,868, filed Apr. 16, 1981 now abandoned.

BACKGROUND OF THE INVENTION

1. Field of the Invention

The invention relates to a device for storing radioactive material in a building in which heat pipes are held in the building wall, the heat exchange surfaces thereof being partly inside and partly outside the building giving off the heat absorbed inside the building to the air through the heat pipe surface outside the building.

2. Description of the Prior Art

Such a device has already been proposed in German Published, Non-prosecuted Application DE-OS No. 29 35 708. In that device, heat pipes have been inserted into the building wall. The outer parts of the heat pipe are provided with fins and can thus give off the heat absorbed inside to the ambient air.

SUMMARY OF THE INVENTION

It is accordingly an object of the present invention to provide a device for storing radioactive material in a building with a heat pipe inserted into the building wall, and to make it possible, with the same safety required for sufficient heat removal, to recover at least part of the heat given off by the radioactive material.

With the foregoing and other objects in view there is provided, in accordance with the invention, a device for storing radioactive material in a building, comprising a building wall defining an interior of the building, heat pipes being disposed or held in the wall and having heat exchange surfaces including a part thereof disposed outside the building for giving off heat absorbed in the interior of the building to the air through the part of the heat exchange or dispensing surfaces outside the building, cooling jackets surrounding the heat exchange surfaces at least in vicinity of the wall, and a cooling loop for circulating coolant being connected to the cooling jackets for heat recovery.

In accordance with another feature of the invention, the cooling loop is a secondary cooling loop, and there is provided at least a pump or blower disposed in the secondary cooling loop, a heat recovery loop, and a heat exchanger coupling the secondary cooling loop to the heat recovery loop.

In accordance with a further feature of the invention, each of the heat pipes have an end protruding outside the wall, and there is provided a chimney wall surrounding the pipe ends.

In accordance with an added feature of the invention, there is provided a part of the heat pipes not covered by and being outside the cooling jackets, and cooling fins disposed on the heat pipes at that part thereof.

In accordance with a concomitant feature of the invention, the cooling jackets are disposed outside the wall.

Other features which are considered as characteristic for the invention are set forth in the appended claims.

Although the invention is illustrated and described herein as embodied in a device for storing radioactive material in a building with a heat pipe inserted into the building wall, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a diagrammatic cross-sectional view of the device of the invention installed in a building wall.

Referring now particularly to the single FIGURE of the drawing, it is seen that in a building, the interior of which is designated with reference character A, radioactive material is assumed to be stored. The building is closed off from the outside by a building wall 2, in which several heat pipes 1 are held. Of these heat pipes 1, only one is shown in the drawing. To improve the air movement, the heat pipes 1 are surrounded by a chimney wall 13. The outside space around the building with the building wall 2 is designated with reference character B. Each heat pipe 1 is divided up by the heat given off by the radioactive material in the interior of the building into a heating region 3 which is inside the building, and a cooling region 6 which is located between the chimney wall 13 and the building wall 2.

In the vicinity of the building wall 2 and the outside thereof, the heat pipe 1 is surrounded by a cooling jacket 10. The cooling region 6 of the heat pipe 1 is thereby divided into a cooling region 8, around which a coolant flows, and an air-cooled cooling region 7. To increase the surface area, the heat pipe 1 is provided with cooling fins 14 in the cooling region 7. The cooling jacket 10 is inserted into a secondary cooling loop 9. The secondary cooling loop 9 is constructed as an active cooling loop, since a liquid or gaseous medium circulates and is kept in motion by a pump 15, or a blower, for example. A heat exchanger 12 which is connected into a heat recovery loop 11 is further inserted into the secondary cooling loop 9. In the heat recovery loop 11, the heat can optionally be utilized for any desired purpose, after the temperature is increased by means of a heat pump. It is also possible to dispose the cooling jacket 10 close to the building wall 2 in the interior of the building.

With this apparatus, the following operation is obtained:

For the case when the pump 15 is in operation, water, for instance, with flow through the cooling jacket 10 and thereby cause intensive cooling of the wall of the heat pipe 1 directly next to the building wall 2. In this process, a steam-condensate circulation 4 develops predominantly as drawn in the lower part of the heat pipe. This circulation is shown only in the lower part of the heat pipe 1; actually, the heat transport medium is condensed over the entire circumference of the heat pipe 1 in the region of the cooling jacket 10. The part of the heat pipe 1 disposed outside the cooling jacket 10 will therefore assume approximately the ambient temperature, and relatively little heat will be given off to the air in the cooling region 7.

If for any reason the active cooling loop fails or if no heat is required in the heat recovery loop 11, the pump 15 is switched off and the cooling of the heat pipe 1 in the region of the cooling jacket 10 ceases. Then, the coldest point of the heat pipe 1 is in the region outside the cooling jacket 10, so that the steam-condensate circulation 5 indicated in the upper part of the heat pipe results. The heat removal is therefore not disturbed even if the cooling loop is connected to the cooling jacket 10 fails, so that the safety of the heat removal is provided unchanged.

What is claimed is:
1. Device for storing radioactive material in a building, comprising:
a building wall defining an interior of the building; means for removing heat from the building through the exclusive use of cooling air, said cooling air heat removal means including:
one-piece, substantially straight heat pipes being disposed in the wall and having heat exchange surfaces including a part thereof disposed outside the building for giving off heat absorbed in the interior of the building to the air through said part of said heat exchange surface outside the building, each of said heat pipes having a respective closed end protruding outside each side of the wall, a chimney wall surrounding said pipe ends outside the wall defining a cooling chimney for exclusively conducting cool air, cooling jackets surrounding said heat exchange surfaces in said chimney immediately outside the wall defining a space between said cooling jackets and said heat exchange surfaces exclusively containing air, cooling fins disposed directly on said heat pipes between said cooling jackets and said chimney wall for exposure to cooling air in said chimney;
and a secondary cooling device including a secondary cooling loop for circulating air being connected to said cooling jackets for heat recovery, means disposed in said secondary cooling loop for circulating coolant through said secondary cooling loop, a heat recovery loop, and a heat exchanger coupling said secondary cooling loop to said heat recovery loop.
2. Device according to claim 1, wherein said circulating means are in the form of a blower.

* * * * *